United States Patent [19]
Yamakawa et al.

[11] Patent Number: 5,737,294
[45] Date of Patent: Apr. 7, 1998

[54] OBJECTIVE LENS WITH TWO NUMERICAL APERTURES FOR READING/WRITING TWO OPTICAL DISCS

[75] Inventors: Akio Yamakawa, Kanagawa; Kamon Uemura, Tokyo, both of Japan

[73] Assignee: Sony Corporation, Tokyo, Japan

[21] Appl. No.: 607,449

[22] Filed: Feb. 27, 1996

[30] Foreign Application Priority Data

Mar. 10, 1995 [JP] Japan ..................... 7-051311

[51] Int. Cl.⁶ ..................... G11B 7/00; G02B 3/00
[52] U.S. Cl. ..................... 369/99; 369/44.37; 369/112; 369/44.23
[58] Field of Search ..................... 369/44.37, 107.13, 369/124, 109, 94, 112, 275.1, 275.4, 44.23, 281

[56] References Cited

U.S. PATENT DOCUMENTS

| | | | |
|---|---|---|---|
| 5,446,565 | 8/1995 | Komma et al. | 369/112 |
| 5,471,455 | 11/1995 | Jabr | 369/44.37 |
| 5,526,338 | 6/1996 | Hasman et al. | 369/94 |
| 5,608,715 | 3/1997 | Yokogawa et al. | 369/275.1 |

Primary Examiner—David C. Nelms
Assistant Examiner—Kim-Kwok Chu
Attorney, Agent, or Firm—Ronald P. Kananen

[57] ABSTRACT

An objective lens having at least two regions of different numerical apertures is configured for focusing a light beam through the regions of the different numerical apertures on two different signal recording surfaces of at least two optical discs having light transmitting layers of different thicknesses. Since the objective lens is integrally formed by at least two lens portions, a light beam outgoing from a common light source is focused on signal recording surfaces of at least two optical discs having the light transmitting layers of different thicknesses.

13 Claims, 9 Drawing Sheets

OBJECTIVE LENS WITH TWO NUMERICAL APERTURES FOR READING/WRITING TWO OPTICAL DISCS

BACKGROUND OF THE INVENTION

This invention relates to an objective lens for focusing a light beam on a signal recording surface of each of two optical discs having light transmitting layers with different thicknesses from the light incident surfaces to the signal recording surfaces. The invention also relates to an optical head device employing the objective lens and an optical disc reproducing apparatus employing such an optical head device.

Figure 1:
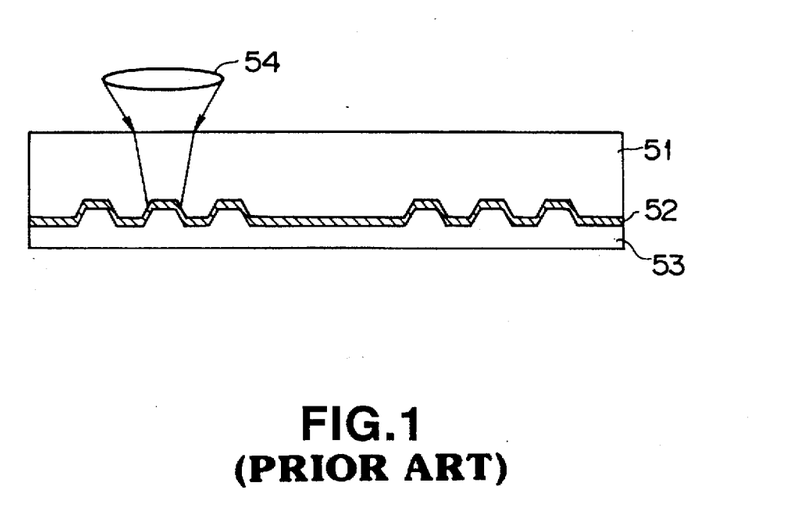
FIG. 1 is a cross-sectional view showing the structure of an optical disc whose light transmitting layer has a thickness of, for example, 1.2 mm.

An optical disc, shown in FIG. 1, among customary optical recording media, has a light transmitting layer 51 comprised of a disc substrate having a thickness of 1.2 mm. On one side of the light transmitting layer 51 is formed a signal recording portion in the form of information pits or guide grooves, while a reflecting film 52 and a protective film 53 for protecting the reflective film 52 are formed in this order on the signal recording portion. The laser light condensed by an objective lens 54 of an optical head device is transmitted through the light transmitting layer 51 so as to be illuminated on the information pits or the guide grooves.

Thus, looking from the side of the objective lens 54 of the optical head device, the reproducing laser light beam is radiated through the light transmitting layer 51, with a thickness of, for example, 1.2 mm, to information pits, from which the laser light beam is reflected back through the light transmitting layer 51 for reading out the information.

Up to now, attempts have been made for increasing the recording density and hence the recording capacity of optical discs. This high density recording may be achieved by, for example, reducing the wavelength of the laser light beam during recording or by increasing the numerical aperture of the objective lens. For reproducing a disc-shaped optical recording medium on which information signals have been recorded with high recording density, attempts have also been made for achieving high-density reproduction by reducing the wavelength of the laser light beam or by increasing the numerical aperture of the objective lens.

If the numerical aperture NA is increased as described above, the apparatus has lowered stability in connection with, for example, tilt of the optical disc, even though the high density reproduction is achieved. The reason is that, if the numerical aperture NA is increased, the depth of focus is decreased thus reducing the tolerance to disc tilt.

If the optical disc is tilted with respect to the optical axis of the objective lens, the wavefront surface W(x, y), which is produced in approximate proportion to a third power of the numerical aperture NA and to a first power of the skew θ, is given by $$W(x, y) = W_{31} * x(x^2 + y^2) \quad (1)$$

so that coma aberration of the third order becomes predominant. The Seidel's coma aberration coefficient of the third order $W_{31}$ is given by $$W_{31} = \frac{n^2 - 1}{2n^2} \ t*\theta*NA^3/\lambda \quad (2)$$

wherein the unit is normalized with the wavelength λ and t, n, θ and NA denote a thickness of the light transmitting layer, refractive index of the light transmitting layer, the amount of disc skew and the numerical aperture of the objective lens, respectively.

If an objective lens with a numerical aperture of 0.6 equal to 1.33 times as large as the numerical aperture NA of 0.45 used for a customary compact disc player is used for a conventional optical pickup device, and the disc skew produced in the compact disc player is the same, the coma aberration produced is 3.5 times as large as that produced by an objective lens with the numerical aperture NA of 0.45, because the coma aberration coefficient is normalized with the wavelength λ.

Above all, if a mass-produced optical disc whose substrate is formed of polycarbonate and hence has a disc skew of ±0.5 to 1 is reproduced using an objective lens whose numerical aperture NA is 0.6, the wavefront W(x,y), having the wavefront W(x,y) is produced shown by the equation (1) and the predominant coma aberration coefficient $W_{31}$ shown in the equation (2). The result is that a spot of an image formed on the optical disc becomes non-symmetrical and inter-symbol interference is significantly increased because the waveform distortion is increased. Accordingly, it is difficult to read out signals satisfactorily.

In this consideration, attempts have been made for e.g., halving the thickness t of the light transmitting layer from a conventional value of 1.2 mm to 0.6 mm thereby halving the coma aberration coefficient $w_{31}$ of the third order shown by the equation (2).

For focusing a light beam via an objective lens of an optical head device on signal recording layers formed on the underside of two light transmitting layers, it has been known to use an optical element designed for generating two light beams having different focal lengths, such as a hologram. However, the double-focus hologram, exploiting the diffraction, is expensive and low in efficiency.

It has also been known to restrict the width of the light beam from the light source prior to incidence on the objective lens by a light-shielding actuator for varying the focal length. In an apparatus employing such actuator, the number of component parts is increased, while the apparatus becomes expensive and cannot be easily reduced in size.

SUMMARY OF THE INVENTION

It is therefore an object of the present invention to provide an objective lens whereby at least two light beams of different focal lengths may be produced without employing special devices, above all, peripheral devices.

In one aspect, the present invention provides an objective lens having at least two regions of different numerical apertures and configured for focusing a light beam from a light source as two light beams transmitted through the two regions of different numerical apertures. The two light beams are focused on signal recording surfaces of at least two optical discs having light transmitting layers of different thicknesses.

In another aspect, the present invention provides an optical head device including a light source radiating a light beam, light beam separating means for separating an outgoing light from the light source and return light from two optical discs, an objective lens arranged between the light beam separating means and the optical disc, and a photoelectric conversion means for receiving the reflected light beams from signal surfaces of at least two optical discs separated by the separating means for converting the reflected light beams into electrical signals. The objective lens has at least two regions of different numerical apertures configured for focusing a light beam outgoing from a light source as light beams transmitted through the regions of the different numerical apertures on signal recording surfaces of at least two optical discs having light transmitting layers of different thicknesses.

In yet another aspect, the present invention provides an optical disc reproducing apparatus including an optical head portion for radiating a light beam on a signal recording surface of an optical disc and for receiving the light beam reflected by the signal recording surface for converting the received light beam into electrical signals, and reproducing means for reproducing information signals recorded on the signal recording surface based upon an output of the optical head portion. The head portion has an objective lens having at least two regions of different numerical apertures configured for focusing a light beam outgoing from a light source as light beams transmitted through the regions of the different numerical apertures on different signal recording surfaces of at least two optical discs having light transmitting layers of different thicknesses.

Since the objective lens is integrally formed by at least two lens portions, a light beam from a common light source is focused on signal recording surfaces of at least two optical discs having light transmitting layers of different thicknesses.

EMBODIMENTS

Figure 2:
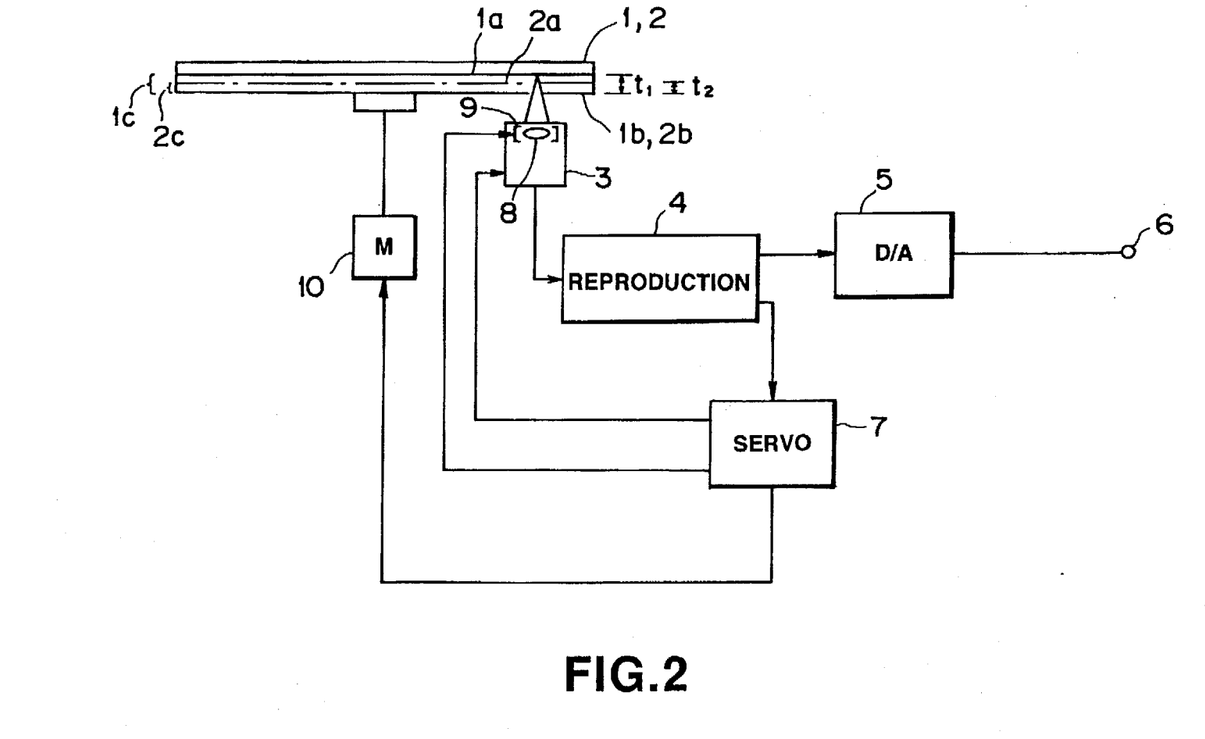
FIG. 2 is a schematic block diagram showing the structure of an optical disc reproducing apparatus embodying the present invention.

Referring to the drawings, preferred embodiments of an objective lens, an optical head device and an optical disc reproducing apparatus according to the present invention will be explained in detail. FIG. 2 shows an optical disc reproducing apparatus configured for reproducing information signals from a signal recording surface 1a of an optical disc 1 and from a signal recording surface 2a of an optical disc 2. The two optical discs 1 and 2 have light transmitting layers of different thicknesses.

The light transmitting layer of the optical disc 1 from the light incident surface 1b to the signal recording surface 1a has a thickness t1 which is larger than the thickness t2 of the light transmitting layer of the optical disc 2 from the light incident surface 2b to the signal recording surface 2a. The light transmitting layer of the optical disc 1 having the thickness t1 and the light transmitting layer of the optical disc 2 having the thickness t2 are denoted as 1c and 2c, respectively. The thicknesses t1 and t2 may, for example, be 1.2 mm and 0.6 mm, respectively.

The optical disc reproducing apparatus includes an optical head portion 3 for radiating a light beam with a wavelength of, for example, 635 nm, on the two signal recording surfaces 1a or 2a via the light transmitting layers 1c or 2c of the different thicknesses t1 or t2, and for converting the reflected light from the optical discs 1 or 2 into electrical signals, and a reproducing unit 4 responsive to electrical signals produced by the optical head portion 3 for reproducing information signals recorded on the signal recording surfaces 1a or 2a.

The reproducing unit 4 processes electrical signals detected by the optical head portion 3 for generating playback signals, such as RF signals, tracking error signals or focusing error signals. The RF signals are processed with, for example, EFM demodulation and CIRC decoding, for producing playback digital data. In the case of an optical disc having a diameter of 64 mm, speech decoding for data expansion is further carried out for producing playback digital data. The playback digital data, outputted by the reproducing unit 4, is converted by a digital/analog (D/A) converter 5 into analog audio data of L and R channels, which are outputted at an output terminal 6.

The tracking error signals and the focusing error signals are supplied to a servo circuit 7. The servo circuit 7 is responsive to these signals to effect tracking error control, focusing control and thread control. That is, a focusing drive signal is applied to a bi-axial mechanism 9 holding an objective lens 8 in the optical head portion 3 for driving the objective lens 8 for movement towards and away from the optical disc 1 or 2 for performing focusing control. Also, a tracking driving signal is applied to the bi-axial mechanism 9 for driving the objective lens 8 radially of the optical disc 1 or 2 for performing tracking control. In addition, low-range components of the tracking error signals are extracted for generating thread drive signals for driving a thread mechanism for radially moving the optical head portion 3 in its entirety along the radius of the optical disc 1 or 2.

The reproducing unit 4 also generates a spindle error signal from clocks produced on supplying the playback data into a PLL circuit. The spindle error signal thus generated is supplied to the servo circuit 7 which then controls the spindle motor 10 so that the motor 10 will be rotated at a constant linear velocity (CVV).

Figure 3:
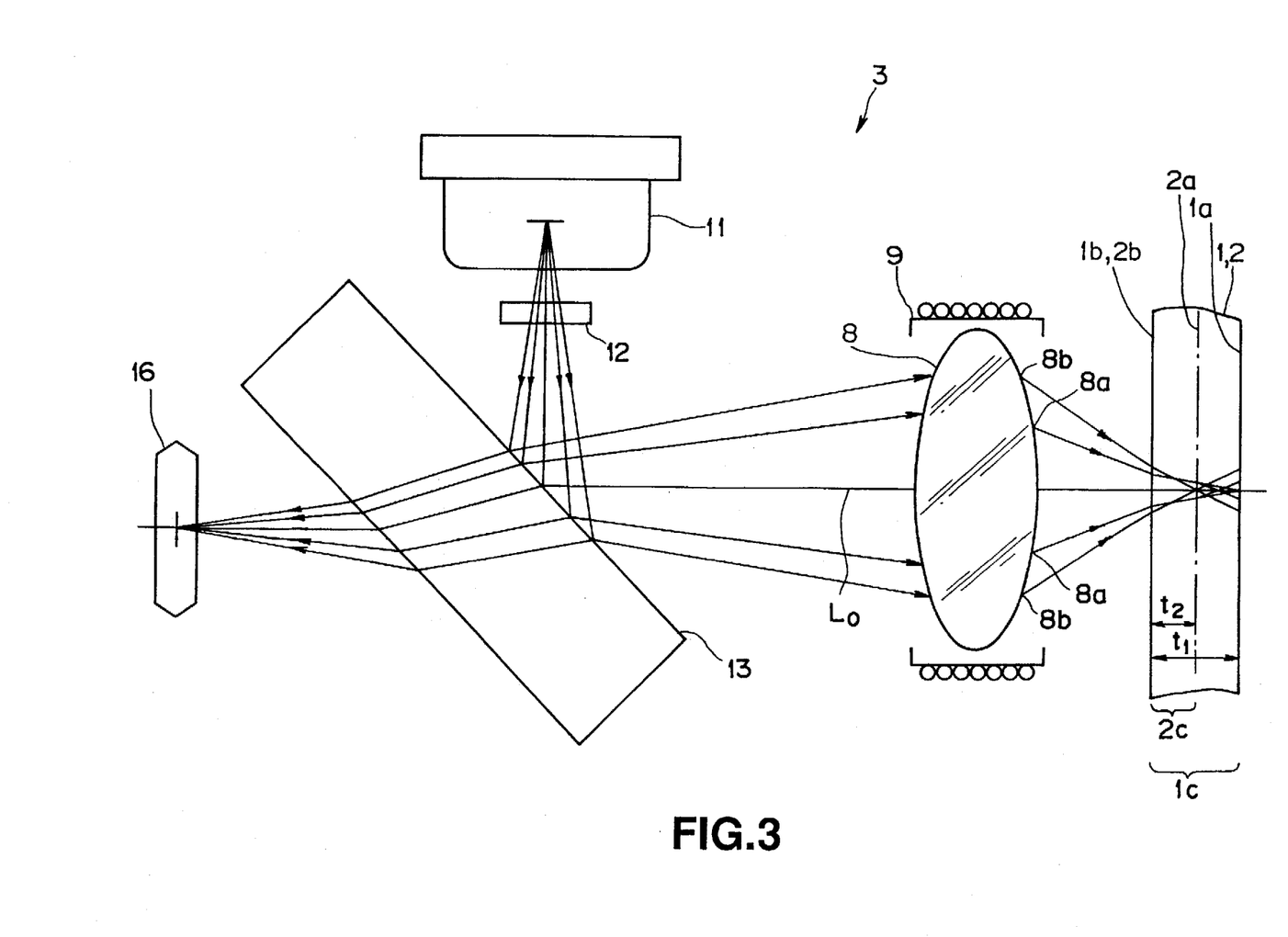
FIG. 3 is a schematic side view showing an optical head portion employed in the optical disc reproducing apparatus shown in FIG. 1.

Referring to FIG. 3, the optical head 3 includes a light source 11, such as a laser diode, for radiating a common light beam to the signal recording surfaces 1a or 2a of the optical disc 1 or 2, and a beam splitter 13 for reflecting at least a portion of the light beam from a light source 11 incident on the beam splitter via a diffraction lattice 12 and for transmitting at least a portion of the return light from the optical disc. The optical head portion 3 also includes a double-focus objective lens 8 and a bi-axial mechanism 9 for driving the double-focus objective lens 8 in the focusing direction and in the tracking direction. The double-focus objective lens 8 is formed integrally from two lens portions 8a, 8b configured for focusing the light beam reflected by the beam splitter 13 on the signal recording surfaces 1a and 2a of the two optical discs 1 and 2, respectively. In addition, the optical head portion 3 includes a photodetector 16, such as a photodiode, for converting the reflected light beams from the signal recording surfaces 1a and 2a of the two optical discs 1 and 2 via beam splitter 13 for converting the received light into electrical signals.

Figure 4:
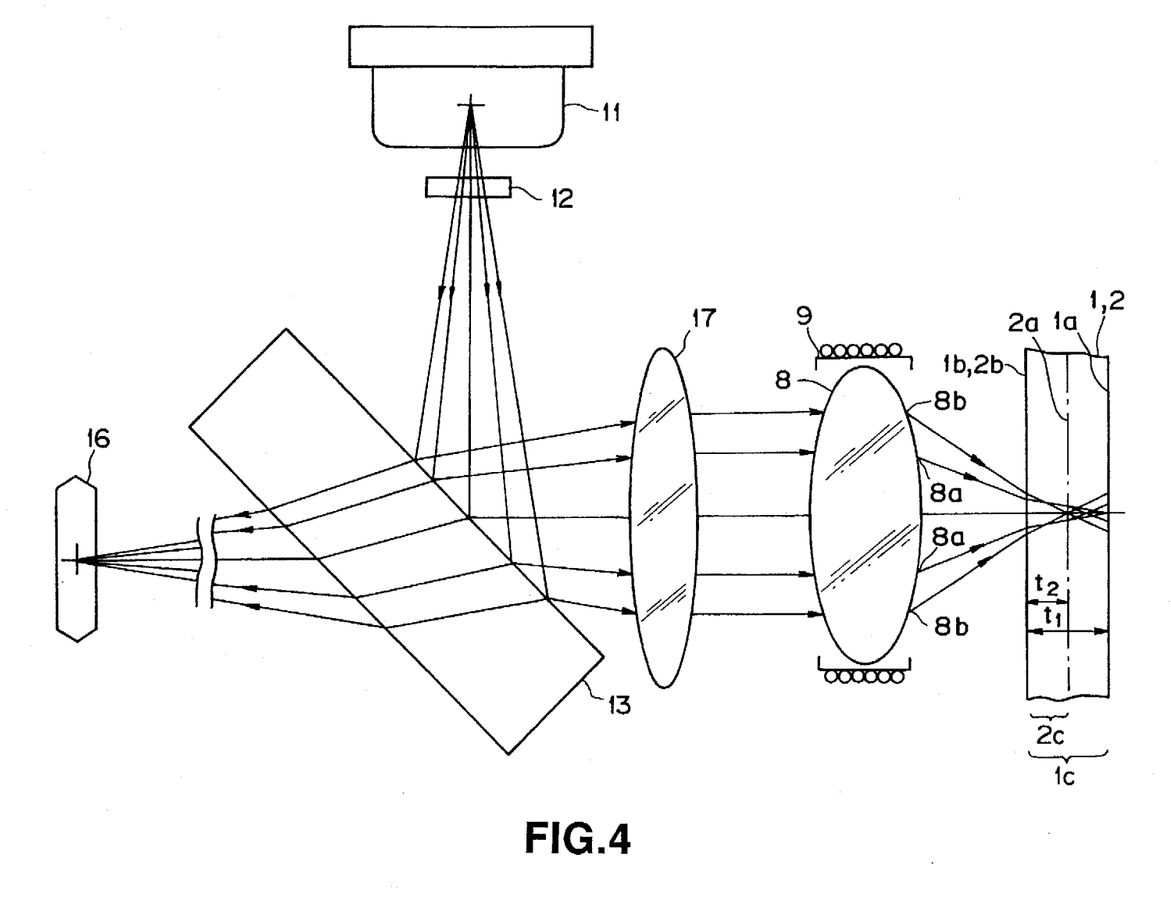
FIG. 4 is a schematic side view showing another optical head portion employed in the optical disc reproducing apparatus shown in FIG. 1.

The optical head portion 3 is of a finite system since no collimator lens is used. Alternatively, a collimator lens 17 may be arranged between the beam splitter 13 and the double-focus objective lens 8, the optical head portion 3 then being of an infinite system, as shown in FIG. 4. In the following description, the optical head portion 3 is assumed to be of a finite system.

The optical head portion 3 guides the light beam radiated by the light source 11 to the double-focus objective lens 8 via the diffraction lattice 12 and the beam splitter 13. The double-focus objective lens system 8 focuses the incident light beam with a wavelength of, for example, 835 nm, on the signal recording surfaces 1a or 2a in a manner tabulated in Table 1.

| design specifications | mid part 8a | rim part 8b |
| --- | --- | --- |
| light beam wavelength | 635 nm | 635 nm |
| focal length | 2.85 mm | 2.62 mm |
| numerical aperture | 0.35 | 0.60 |
| multiplication factor | −1/7.1 | −1/8.0 |
| operating distance | 1.20 mm | 1.20 mm |
| ref. object image distance | 28.845 mm | 28.245 mm |
| cover glass | | |
| light source side | 1.0 mm (BK7) | 1.0 mm (BK7) |
| disc side | 1.2 mm (PC) | 0.6 mm (PC) |

As indicated in the above table 2, the two lens portions of the double-focus objective lens 8 are divided into a mid part 8a and a rim part 8b. The mid part 8a focuses the light beam with a wavelength of 635 nm on the signal recording surface 1a of the optical disc 1 with a focal length of 2.85 nm. On the other hand, the rim part 8b focuses the light beam with a wavelength of 635 nm on the signal recording surface 2a of the optical disc 2 with a focal length of 2.62 nm.

Figure 5:
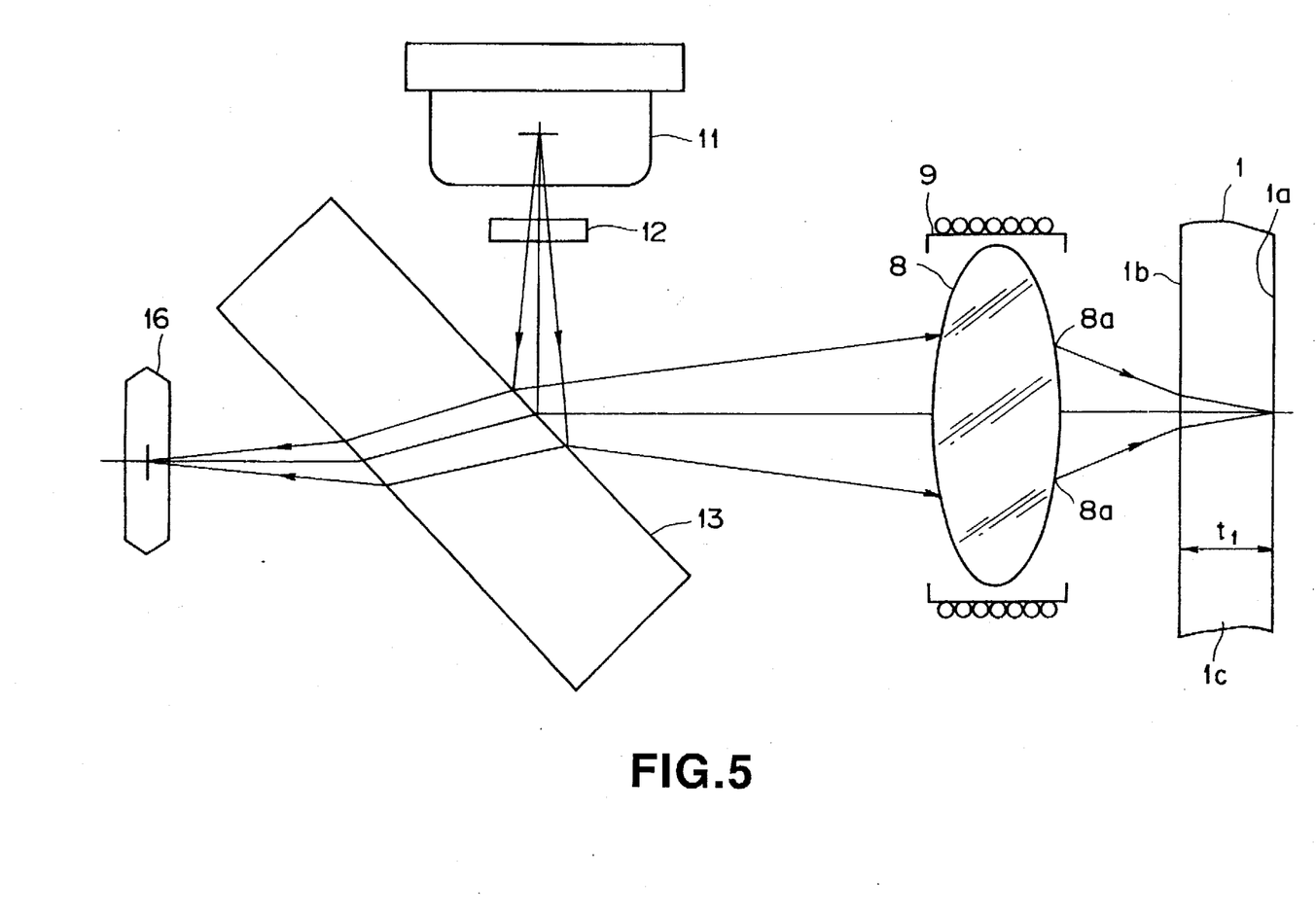
FIG. 5 is a schematic side view showing the state in which the optical head portion shown in FIG. 2 is radiating a light beam on an optical disc having a light transmitting layer of increased thickness.
Figure 8:
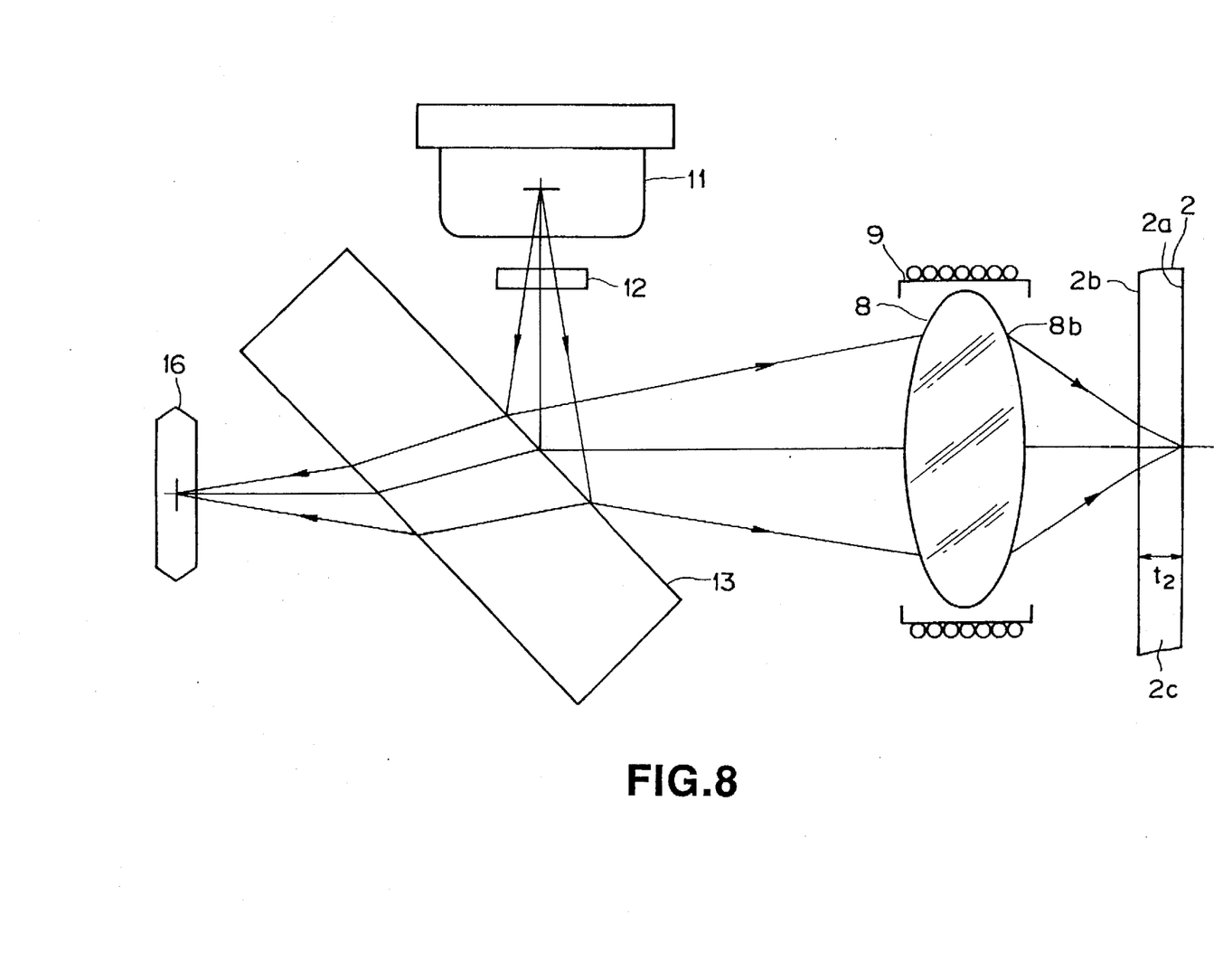
FIG. 8 is a schematic side view showing the state in which the optical head portion shown in FIG. 2 is radiating a light beam on an optical disc having a light transmitting layer of decreased thickness.

Meanwhile, if the light beam from the mid part 8a of the double-focus objective lens 8 is focused on the signal recording surface 1a for detecting the reflected light, as shown in FIG. 5, the light beam from the rim part 8b of the double-focus objective lens 8 is radiated so as to be focused on the signal recording surface 2a of the optical disc 2, as shown in FIG. 8. This light beam is reflected by the signal recording surface 1a of the optical disc 1 so as to be returned as stray light rays via the double-focus objective lens 8 and the beam splitter 13 towards the photodetector 16.

Figure 6:
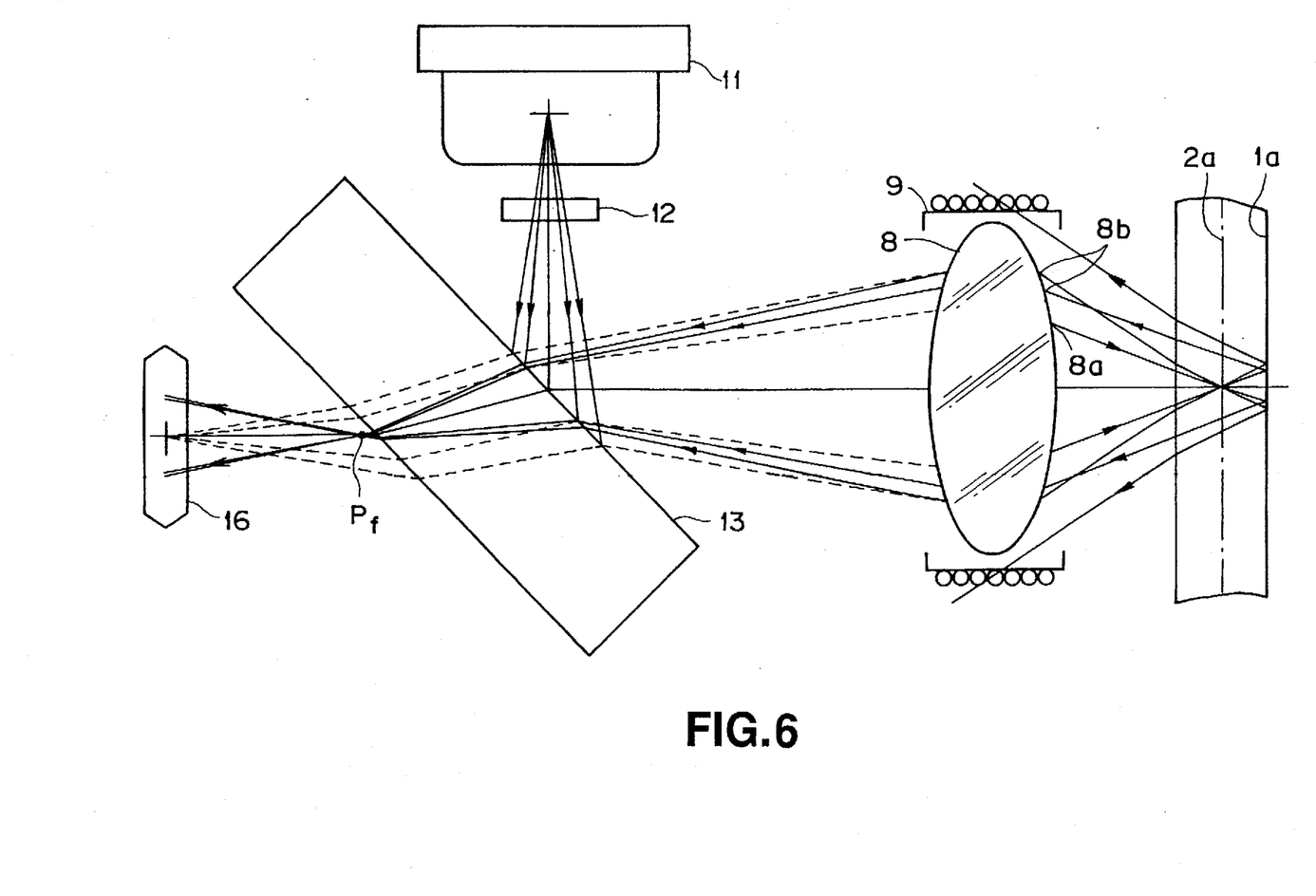
FIG. 6 is a schematic side view showing the state of stray light produced when the optical head portion shown in FIG. 2 is radiating a light beam on an optical disc having a light transmitting layer of increased thickness.
Figure 7:
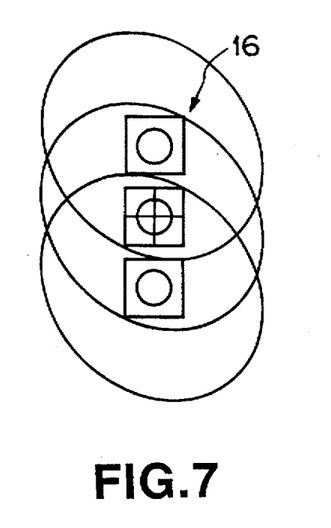
FIG. 7 shows the state of the stray light at the photosensor portion.

These stray light rays are focused at a conjugate focal point $P_f$ associated with the signal recording surface 1a of the optical disc 1 before being incident on the photodetector 16, as shown in FIG. 6. Thus, these stray light rays cancel one another, so that the photodetector 16 detects only the reflected light of the light beam focused on the signal recording surface 1a shown in FIG. 5, as indicated by broken lines in FIG. 5.

Figure 9:
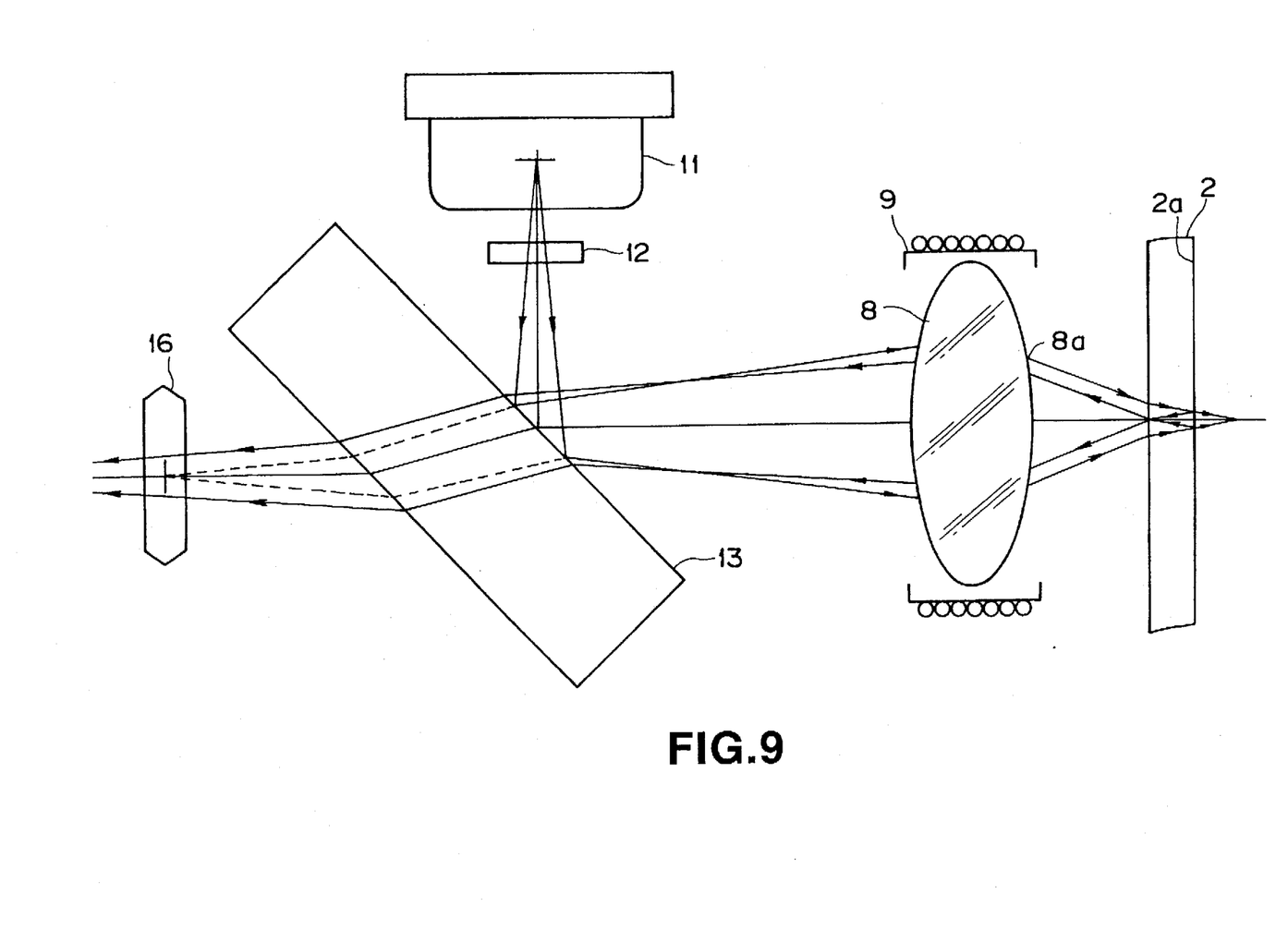
FIG. 9 is a schematic side view showing the state of stray light produced when the optical head portion shown in FIG. 2 is radiating a light beam on an optical disc having a light transmitting layer of decreased thickness.

On the other hand, if the light beam from the rim part 8b of the double-focus objective lens 8 is focused on the signal recording surface 2a for detecting the reflected light, as shown in FIG. 8, the light beam from the mid part 8a of the double-focus objective lens 8 is radiated so as to be focused on the signal recording surface 1a of the optical disc 1, as shown in FIG. 9. This light beam is reflected by the signal recording surface 2a of the optical disc 2 so as to be returned as stray light rays via the double-focus objective lens 8 and the beam splitter towards the photodetector 16.

Figure 10:
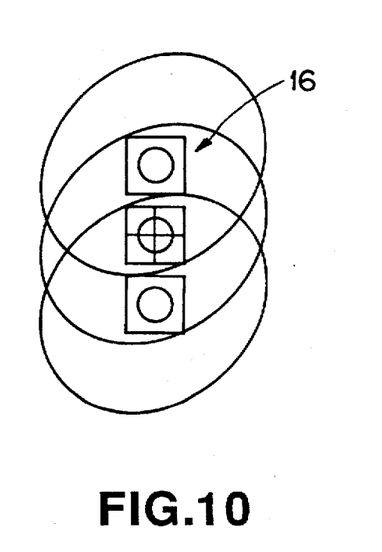
FIG. 10 shows the state of the stray light at the photosensor portion.

These stray light rays are focused at a conjugate point associated with a focal point of the light beam reflected by the signal recording surface 1a of the optical disc 1. Thus, although the stray light rays are incident on the photodetector 16, as shown in FIG. 10, these light rays cancel one another, so that the photodetector 16 detects only the reflected light of the light beam focused on the signal recording surface 2a shown in FIG. 8, as indicated by broken lines in FIG. 9.

The optical disc reproducing apparatus of the instant embodiment has the double-focus objective lens 8 in the optical head portion 3 thereof for focusing the light beam on two signal recording surfaces having different distances from the light incident surface, thereby enabling the size and the production costs to be reduced. On the other hand, the stray light produced as shown in FIG. 68 when one of the optical disc, such as the optical disc 1, is reproduced, as shown in FIG. 5, is not detected by the photodetector 16, so that it becomes possible with the present optical disc reproducing apparatus to reproduce two optical discs with high accuracy.

What is claimed is:

1. An objective lens having at least a first region and a second region, said first and second regions having different numerical apertures and being configured for focusing a light beam on first and second signal recording surfaces which are spaced apart from each other.

2. The objective lens as claimed in claim 1 in combination with said first and second signal recording surfaces, wherein said first and second signal recording surfaces are formed on an underside of first and second light transmitting layers respectively with said first and second light transmitting layers have respective thicknesses of 1.2 mm and 0.6 mm.

3. The objective lens as claimed in claim 1, wherein said first region is formed in a central portion of said lens and said second region is formed in a peripheral portion of said lens.

4. The objective lens as claimed in claim 3, wherein said first region formed in a central portion of said lens has a higher numerical aperture than said second region formed in a peripheral portion of said lens.

5. An optical head comprising:

a light source radiating a light beam;

light beam separating means for separating said light beam from reflected light;

an objective lens arranged between said light beam separating means and said optical disc, said objective lens having at least first and second regions, said first and second regions having different numerical apertures and being configured for focusing said light beam on first and second signal recording surfaces; and photo-electric conversion means for receiving reflected light from said signal recording surfaces through said separating means and for converting said reflected light into electrical signals.

6. The optical head device as claimed in claim 5, wherein said first region is formed in a central portion of said lens and said second region is formed in a peripheral portion of said lens.

7. The objective lens as claimed in claim 6, wherein said first region formed in a central portion of said lens has a higher numerical aperture than said second region formed in a peripheral portion of said lens.

8. The optical head as claimed in claim 5 in combination with said first and second signal recording surfaces, wherein said first and second signal recording surfaces are formed on an underside of first and second light transmitting layers respectively with said light transmitting layers having respective thicknesses of 1.2 mm and 0.6 mm.

9. An optical disc reading apparatus comprising:

an optical head for radiating a light beam on first and second signal recording surfaces of an optical disc and for receiving the light beam reflected by the signal recording surfaces, and for converting the received light beam into electrical signals; and reproducing means for reproducing information signals recorded on said signal recording surfaces based upon an output of said optical head;

said head having an objective lens with first and second regions, said first and second regions having different numerical apertures and being configured for focusing a light beam outgoing from a light source on said signal recording surfaces.

10. The optical disc reading apparatus as claimed in claim 9, wherein said reproducing means reproduces said electrical signals corresponding to the reflected light beams from the signal recording surfaces.

11. The optical disc reading apparatus as claimed in claim 9, wherein said first and second signal recording surfaces are formed on an underside of first and second light transmitting layers respectively with said light transmitting layers having respective thicknesses of 1.2 mm and 0.6 mm.

12. The optical disc reading apparatus as claimed in claim 9, wherein said first region is formed in a central portion of said lens and said second region is formed in a peripheral portion of said lens.

13. The optical disc reading apparatus as claimed in claim 12, wherein said first region formed in a central portion of said lens has a higher numerical aperture than said second region formed in a peripheral portion of said lens.

* * * * *

(12) EX PARTE REEXAMINATION CERTIFICATE (5010th)
United States Patent
Yamakawa et al.

(10) Number: US 5,737,294 C1
(45) Certificate Issued: Nov. 2, 2004

(54) OBJECTIVE LENS WITH TWO NUMERICAL APERTURES FOR READING/WRITING TWO OPTICAL DISCS

(75) Inventors: Akio Yamakawa, Kanagawa (JP); Kamon Uemura, Tokyo (JP)

(73) Assignee: Sony Corporation, Tokyo (JP)

Reexamination Request:
No. 90/005,425, Jul. 16, 1999

Reexamination Certificate for:
Patent No.: 5,737,294
Issued: Apr. 7, 1998
Appl. No.: 08/607,449
Filed: Feb. 27, 1996

(30) Foreign Application Priority Data

Mar. 10, 1995 (JP) ................................. 7-051311

(51) Int. Cl.[7] .............................. G11B 7/00; G02B 3/00
(52) U.S. Cl. ............................ 369/112.26; 369/44.23; 369/44.37
(58) Field of Search ................. 369/94, 112, 44.23, 369/44.37, 99, 112.1, 44.14; 359/719, 742, 743, 15, 19, 566

(56) References Cited

U.S. PATENT DOCUMENTS

| | | | |
|---|---|---|---|
| 4,817,072 A | * | 3/1989 | Toide et al. ............. 369/44.37 |
| 5,495,461 A | * | 2/1996 | Komma et al. ............. 369/103 |
| 5,721,629 A | * | 2/1998 | Lee ............................. 359/15 |
| 5,777,803 A | * | 7/1998 | Ju et al. ...................... 359/719 |

FOREIGN PATENT DOCUMENTS

| | | | |
|---|---|---|---|
| EP | 0 470 807 | * | 2/1992 |
| EP | 0 610 055 | * | 8/1994 |
| JP | 2-042644 | * | 2/1990 |
| JP | 06-215406 | * | 8/1994 |

* cited by examiner

Primary Examiner—William Korzuch (57) ABSTRACT

An objective lens having at least two regions of different numerical apertures is configured for focusing a light beam through the regions of the different numerical apertures on two different signal recording surfaces of at least two optical discs having light transmitting layers of different thicknesses. Since the objective lens is integrally formed by at least two lens portions, a light beam outgoing from a common light source is focused on signal recording surfaces of at least two optical discs having the light transmitting layers of different thicknesses.

ＥＸ ＰＡＲＴＥ
ＲＥＥＸＡＭＩＮＡＴＩＯＮ ＣＥＲＴＩＦＩＣＡＴＥ
ＩＳＳＵＥＤ ＵＮＤＥＲ ３５ Ｕ．Ｓ．Ｃ． ３０７

THE PATENT IS HEREBY AMENDED AS INDICATED BELOW.

Matter enclosed in heavy brackets [ ] appeared in the patent, but has been deleted and is no longer a part of the patent; matter printed in italics indicated additions made to the patent.

ONLY THOSE PARAGRAPHS OF THE SPECIFICATION AFFECTED BY AMENDMENT ARE PRINTED HEREIN.

Column 5, lines 16–22:

The optical head portion 3 guides the light beam radiated by the light source 11 to the double-focus objective lens 8 via the diffraction lattice 12 and the beam splitter 13. The double-focus objective lens system 8 focuses the incident light beam with a wavelength of, for example, [835] *635* nm, on the signal recording surfaces 1a or 2a in a manner tabulated in Table 1.

Column 5, lines 36–43:

As indicated in the above table [2] *1*, the two lens portions of the double-focus objective lens 8 are divided into a mid part 8a and a rim part 8b. The mid part 8a focuses the light beam with a wavelength of 635 nm on the signal recording surface 1a of the optical disc 1 with a focal length of 2.85 [nm] *mm*. On the other hand, the rim part 8b focuses the light beam with a wavelength of 635 nm on the signal recording surface 2a of the optical disc 2 with a focal length of 2.62 [nm] *mm*.

Column 5, lines 54–60:

These stray light rays are focused at a conjugate focal point $P_f$ associated with the signal recording surface 1a of the optical disc 1 before being incident on the photodetector 16, as shown in FIG. 6. Thus, these stray light rays cancel one another, so that the photodetector 16 detects only the reflected light of the light beam focused on the signal recording surface 1a shown in FIG. 5, as indicated by broken lines in FIG. [5] *6*.

Column 6, lines 14–25:

The optical disc reproducing apparatus of the instant embodiment has the double-focus objective lens 8 in the optical head portion 3 thereof for focusing the light beam on two signal recording surfaces having different distances from the light incident surface, thereby enabling the size and the production costs to be reduced. On the other hand, the stray light produced as shown in FIG. 6 when one of the optical disc, such as the optical disc 1, is reproduced, as shown in FIG. 5, is not detected by the photodetector 16, so that it becomes possible with the present optical disc reproducing apparatus to reproduce two optical discs with high accuracy.

AS A RESULT OF REEXAMINATION, IT HAS BEEN DETERMINED THAT:

Claims 2 and 11 are cancelled.

Claims 1, 4–7, 9 and 13 are determined to be patentable as amended.

Claims 3, 8, 10 and 12, dependent on an amended claim, are determined to be patentable.

New claims 14, 15, 16 and 17 are added and determined to be patentable.

1. An objective lens having at least a first region and a second region, said first and second regions having different numerical apertures and being configured for focusing a light beam on first and second signal recording surfaces [which are spaced apart from each other],
   *wherein light rays from said light beam incident upon said second region and reflected through said objective lens by said first signal recording surface cancel one another and are not detected, light rays from said light beam incident upon said first region and reflected from said first signal recording surface being detected,*
   *wherein light rays from said light beam incident upon said first region and reflected through said objective lens by said second signal recording surface cancel one another and are not detected, light rays from said light beam incident upon said second region and reflected from said second signal recording surface being detected.*

4. The objective lens as claimed in claim 3, wherein said first region formed in a central portion of said lens has a [higher] *lower* numerical aperture than said second region formed in a peripheral portion of said lens.

5. An optical head comprising:
   a light source radiating a light beam;
   light beam separating means for separating said light beam from reflected light, *said light beam separating means having a first surface and a second surface, said second surface being opposite and non-contiguous to said first surface*;
   an objective lens arranged between said light beam separating means and [said] *an* optical disc, said objective lens having at least first and second regions, said first and second regions having different numerical apertures and being configured for focusing said light beam on first and second signal recording surfaces; and
   photo-electric conversion means for receiving reflected light from said *first and second* signal recording surfaces through said separating means and for converting said reflected light into electrical signals*;*
   *said optical head being configured as a finite optical system in which said reflected light converges within said light beam separating means, said reflected light entering said light beam separating means through said first surface and exiting said light beam separating means through said second surface,*
   *wherein light rays from said light beam incident upon said second region and reflected through said objective lens by said first signal recording surface cancel one another and are not detected, light rays from said light beam incident upon said first region and reflected from said first signal recording surface being detected,*
   *wherein light rays from said light beam incident upon said first region and reflected through said objective lens by said second signal recording surface cancel one another and are not detected, light rays from said light beam incident upon said second region and reflected from said second signal recording surface being detected.*

6. The optical head [device] as claimed in claim 5, wherein said first region is formed in a central portion of said lens and said second region is formed in a peripheral portion of said lens.

7. The [objective lens] *optical head* as claimed in claim 6, wherein said first region formed in a central portion of said lens has a [higher] *lower* numerical aperture than said second region formed in a peripheral portion of said lens.

9. An optical disc reading apparatus comprising:

an optical head for radiating a light beam on first and second signal recording surfaces of [an] *respective* optical [disc] *discs* and for receiving the light beam reflected by the signal recording surfaces, and for converting the received light beam into electrical signals; and reproducing means for reproducing information signals recorded on said *first and second* signal recording surfaces based upon an output of said optical head;

said head having an objective lens with first and second regions, said first and second regions having different numerical apertures and being configured for focusing a light beam outgoing from a light source on said *first and second* signal recording surfaces, wherein light rays from said light beam incident upon said second region and reflected through said objective lens by said first signal recording surface cancel one another and are not detected, light rays from said light beam incident upon said first region and reflected from said first signal recording surface being detected, wherein light rays from said light beam incident upon said first region and reflected through said objective lens by said second signal recording surface cancel one another and are not detected, light rays from said light beam incident upon said second region and reflected from said second signal recording surface being detected.

13. The optical disc reading apparatus as claimed in claim 12, wherein said first region formed in a central portion of said lens has a [higher] *lower* numerical aperture than said second region formed in a peripheral portion of said lens.

14. An optical head comprising:

a light source radiating a light beam;

a beam splitting for separating said light beam from reflected light, said light beam splitter having a first surface and a second surface, said second surface being opposite and non-contiguous to said first surface;

an objective lens having at least first and second regions, said first and second regions having different numerical apertures and being configured for focusing said light beam on first and second signal recording surfaces;

a bi-axial mechanism for driving said objective lens in a focusing direction and in a tracking direction; and photo-electric conversion means for receiving reflected light from said first and second signal recording surfaces through said beam splitter and for converting said reflected light into electrical signals;

said optical head being configured as a finite optical system in which said reflected light converges within said beam splitter, said beam splitter being arranged in a path of said reflected light between said objective lens and said photo-electric conversion means, said reflected light entering said light beam splitter through said first surface and exiting said light beam separating means through said second surface, wherein light rays from said light beam incident upon said second region and reflected through said objective lens by said first signal recording surface cancel one another and are not detected, light rays from said light beam incident upon said first region and reflected from said first signal recording surface being detected, wherein light rays from said light beam incident upon said first region and reflected through said objective lens by said second signal recording surface cancel one another and are not detected, light rays from said light beam incident upon said second region and reflected from said second signal recording surface being detected.

15. The optical head as claimed in claim 14, wherein said first region is formed in a central portion of said objective lens and said second region is formed in a peripheral portion of said objective lens.

16. The objective lens as claimed in claim 1, wherein said first signal recording surface is formed on an underside of a first light transmitting layer, said first light transmitting layer having a thickness of 1.2 mm, said second signal recording surface is formed on an underside of a second light transmitting layer, said second light transmitting layer having a thickness of 0.6 mm.

17. The optical disc reading apparatus as claimed in claim 9, wherein said first signal recording surface is formed on an underside of a first light transmitting layer, said first light transmitting layer having a thickness of 1.2 mm, said second signal recording surface is formed on an underside of a second light transmitting layer, said second light transmitting layer having a thicknesss of 0.6 mm.

\* \* \* \* \*